United States Patent [19]
Suzuki

[11] Patent Number: 6,041,185
[45] Date of Patent: Mar. 21, 2000

[54] CAMERA WITH REMOTE-CONTROL PHOTOGRAPHY AND STROBOSCOPIC PHOTOGRAPHY FUNCTION

[75] Inventor: Tatsuya Suzuki, Tokyo, Japan

[73] Assignee: Olympus Optical Co., Ltd., Japan

[21] Appl. No.: 09/238,276

[22] Filed: Jan. 27, 1999

[30] Foreign Application Priority Data

Jan. 28, 1998 [JP] Japan ................... 10-016183

[51] Int. Cl.$^7$ .................................................. G03B 15/03
[52] U.S. Cl. ............................................. 396/56; 396/177
[58] Field of Search ...................... 396/56–59, 176–178, 396/171, 155

[56] References Cited

U.S. PATENT DOCUMENTS 4,937,604  6/1990  Yoshida et al. ........................ 396/59

FOREIGN PATENT DOCUMENTS 2120841  5/1990  Japan .

*Primary Examiner*—W. B. Perkey
*Attorney, Agent, or Firm*—Ostrolenk, Faber, Gerb & Soffen, LLP

[57] ABSTRACT

In a camera in accordance with the present invention, when a barrier is slid and the camera is set to a photography-enabled state, a strobe light unit is raised to a strobe light irradiation-enabled position. A remote-control light receiving unit is mounted in the face and back of the distal part of the frame of the strobe light unit. The remote-control light receiving units move to a position at which they are projecting from the camera body. During remote-control photography, a remote-control light signal propagating from a position ahead of the camera can be received reliably by the remote-control light receiving unit. Furthermore, a remote-control light signal propagating from behind the camera can be received reliably. Moreover, the camera can contribute to the realization of a compact and high-density design.

7 Claims, 3 Drawing Sheets

CAMERA WITH REMOTE-CONTROL PHOTOGRAPHY AND STROBOSCOPIC PHOTOGRAPHY FUNCTION

BACKGROUND OF THE INVENTION

1. Field of the Invention

The present invention relates to a location of a signal light receiving unit in a camera with both stroboscopic photography and remote-control photography functions.

2. Description of the Related Art

In the past, Japanese Unexamined Patent Publication No. 2-120841 has disclosed a camera with a remote-control function permitting remote-control photography. The camera receives light signals irradiated from a transmitter located at a remote position. Upon reception of the light, the camera starts a release operation (photographic operation). Other numerous proposals have been made of this kind of camera. The light signals receiving unit in the camera with the remote-control function is generally located in the face of the camera.

Among the conventional cameras with a remote-control function, zoom type compact cameras have offered more powerful photographing in recent years. When such a camera is set to a telephoto position for zooming, the lens barrel projects out by a very large magnitude. This poses a problem in that light signals may be intercepted depending on the positional relationship between the camera and a remote-control transmitter.

Furthermore, a photometry unit, range finding unit, and viewfinder must generally be located above the photographic lens in the face of a camera. If a remote-control light signals receiving unit must also be placed above the photographic lens, it is disadvantageous to the pursuit of a compact and high-density design.

When the remote-control light signals receiving unit is located in the face of a camera, the only light signals that can be acquired are the ones received from positions ahead of the camera.

SUMMARY OF THE INVENTION

The present invention attempts to solve the foregoing drawbacks. An object of the present invention is to provide a camera with both a stroboscopic photography function a and remote-control photography function capable of contributing to the realization of a compact and high-density design. Another object of the present invention is to provide a camera with stroboscopic photography and remote-control photography functions capable of receiving remote-control light signals irradiated from any direction other than a ahead of the camera.

According to one aspect of the present invention, a camera with stroboscopic photography and remote-control photography functions includes a strobe light unit and a remote-control light signals receiving unit. The light receiving unit for receiving remote-control light signals is mounted in the strobe light side of the strobe unit. The light receiving unit receives remote-control light signals, whereby remote-control photography is achieved.

According to another aspect of the present invention, a camera with stroboscopic photography and remote-control photography function includes a strobe light unit and a remote-control light signals receiving unit. The light receiving unit is mounted in a side of the strobe light unit opposite than the strobe light side thereof. The light receiving unit receives a remote-control light signals, whereby remote-control photography is achieved.

Other features of the present invention and advantages thereof will be fully apparent from the description below.

DESCRIPTION OF THE PREFERRED EMBODIMENT

An embodiment of the present invention will be described in conjunction with the drawings.

Figure 1:
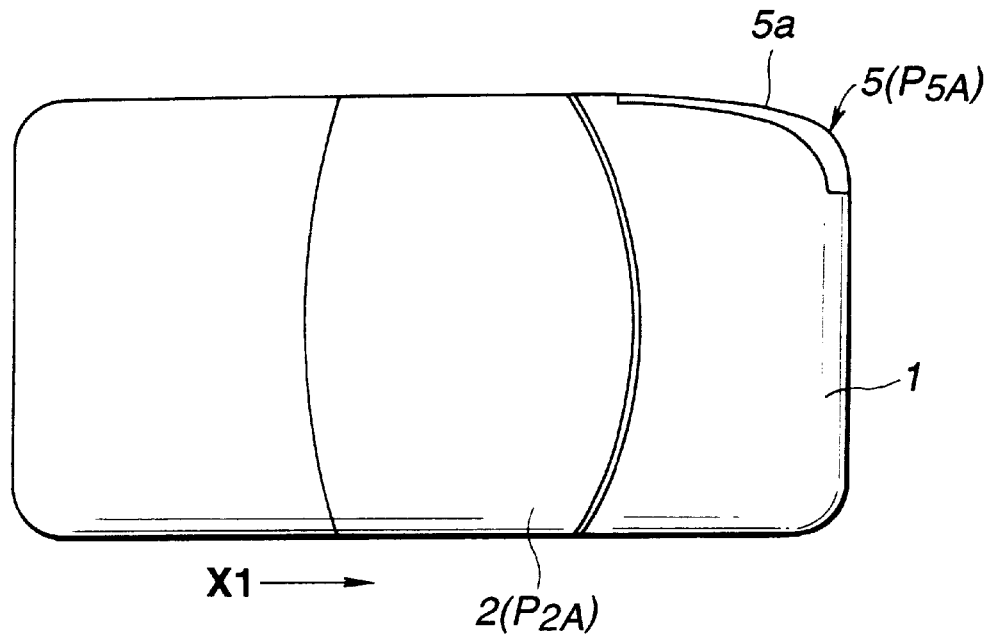
FIG. 1 is a front view showing the appearance of a camera in accordance with an embodiment of the present invention set to a non-photographic state.
Figure 2:
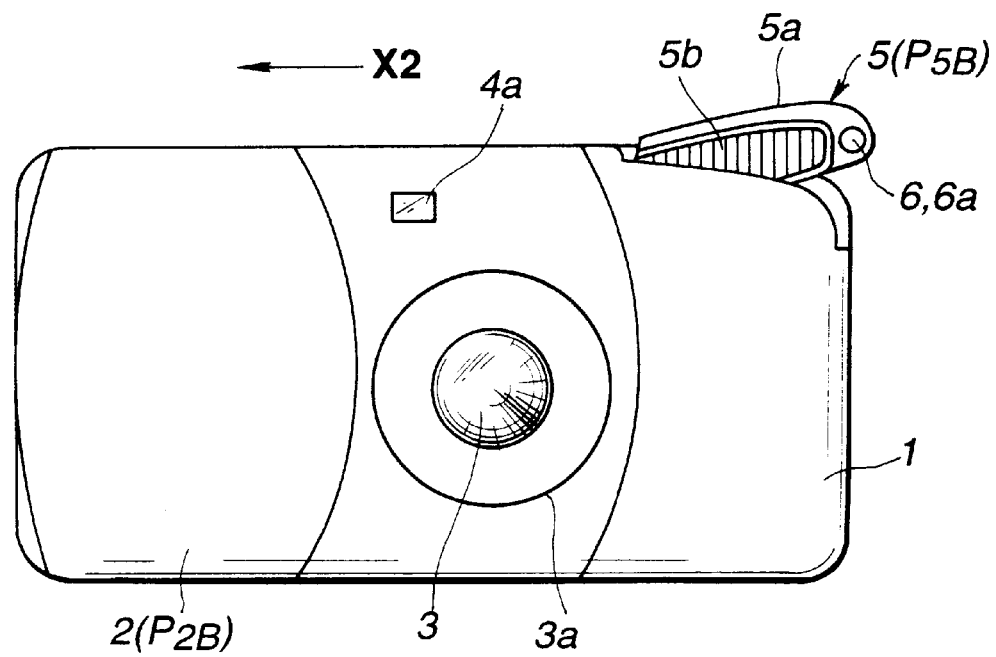
FIG. 2 is a front view showing the appearance of the camera in accordance with the embodiment of FIG. 1 set to a photography-enabled state.
Figure 3:
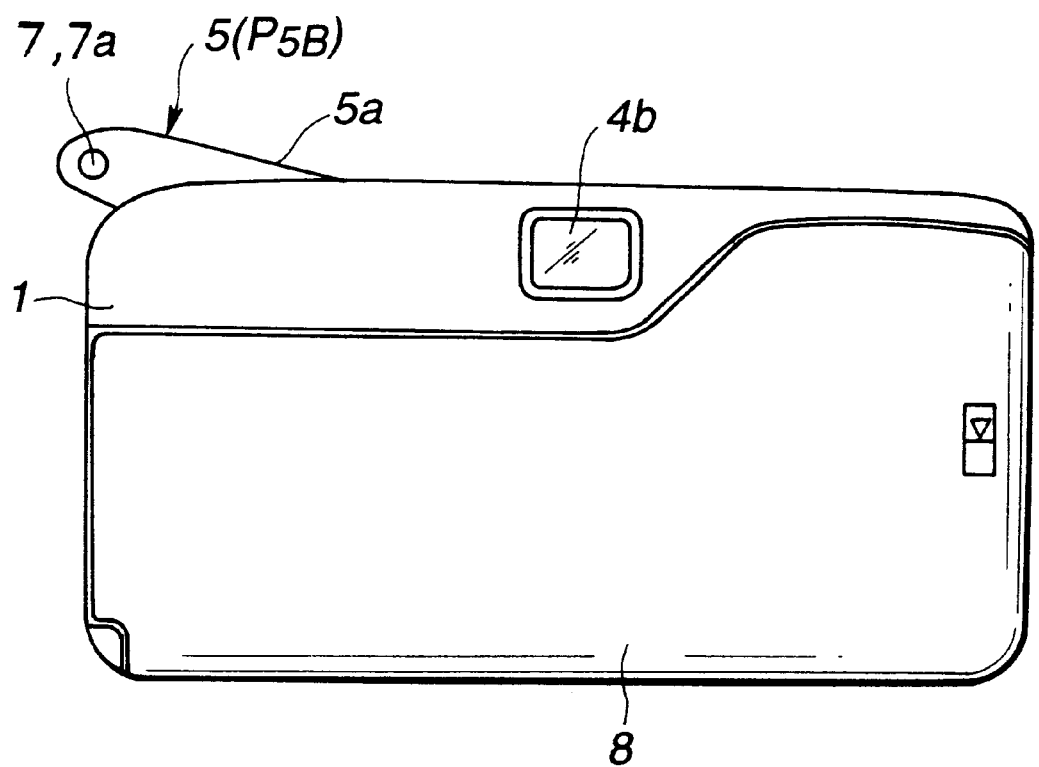
FIG. 3 is a back view showing the appearance of the camera in accordance with the embodiment of FIG. 1 set to the photography-enabled state.

FIG. 1, FIG. 2, and FIG. 3 show the appearance of a camera in accordance with an embodiment of the present invention. FIG. 1 is a front view of the camera in a non-photographic state (lens-collapsed state) in which a photographic lens is collapsed and a barrier has been closed. FIG. 2 is a front view thereof in a photography-enabled state in which the barrier has been opened. FIG. 3 is a back view in the photography-enabled state shown in FIG. 2.

The camera of this embodiment has a barrier 2, a photographic lens 3, a viewfinder window 4a, a strobe light unit 5, and remote-control light receiving units 6 and 7 on the face of a camera body 1. The barrier 2 is used to open or close a lens. The photography lens 3 is held by a lens barrel 3a. The strobe light unit 5 is held by a frame 5a, movable between a stowed position and a raised position at which it can irradiate strobe light, and provided with a window 5b. The remote-control light receiving units 6 and 7 for receiving remote-control light signals are mounted in the face of the distal part of the frame 5a of the strobe light unit 5 on which side the window 5b is formed, and in the back thereof respectively. Moreover, a viewfinder window (on the side of an eyepiece) 4b and a back cover 8 are formed on the back of the camera.

The barrier 2 is supported by the camera body 1 in a movable state in which the barrier can be slid to a closed position P2A (see FIG. 1) or an open position P2B (see FIG. 2). Specifically, when the camera is set to the non-photographic state, the barrier 2 is slid to the closed position at which the barrier 2 shields the photographic lens 3 and the face of the viewfinder window 4a. When the camera is set to the photographic state, the barrier 2 is slid to the open positions Moreover, the frame 5a holding the strobe light unit 5 is supported so as to be able to pivot at the right upper corner of the camera body 1. The frame 5a can pivot between a stowed position P5A and a raised position P5B at which the strobe light unit 5 is raise out of the camera body 1 and capable of irradiating strobe light. The strobe light unit 5 is accommodated by the frame 5a. For example, the strobe light unit 5 may be a typical strobe unit composed of a xenon discharge tube, a reflector, and the strobe window 5b, or a flashlight unit.

The remote-control light receiving unit 6 is, as shown in FIG. 2, mounted in the face of the distal part of the frame 5a of the strobe light unit. The remote-control light receiving unit 6 has a light receiving window 6a. A light receiving device 25 (see FIG. 5) is incorporated in the remote-control light receiving unit 6. Moreover, the remote-control light receiving unit 7 is, as shown in FIG. 3, mounted in the back of the distal part of the frame 5a of the strobe light unit. The remote-control light receiving unit 7 has a light receiving window 7a. A light receiving device 26 (see FIG. 5) for receiving remote-control light signals is incorporated in the light receiving device 26.

Figure 5:
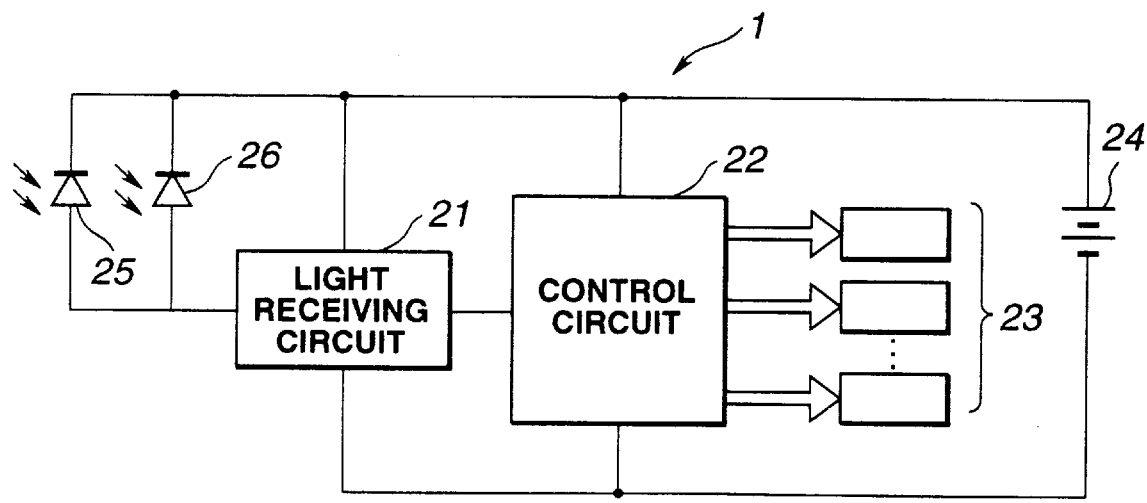
FIG. 5 is a block diagram outlining the electronic circuitry of the camera in accordance with the embodiment of FIG. 1, and showing mainly a remote-control light receiving unit of the camera.

FIG. 5 is a block diagram outlining the electronic circuitry of the camera of this embodiment and showing mainly the remote-control light receiving unit. For carrying out a series of operations to be performed in the camera, a control circuit 22 including a CPU actuates various camera operation control units and features 23 when they are needed. The operation control units and features 23 include a photometry unit and photographic lens driving unit.

Moreover, remote-control light signals sent from a remote-control transmitter 10 (see FIG. 4 and FIG. 6) that will be described later falls on the light receiving device 25 or 26 through a remote-control light receiving window 6a or 7a. The light receiving devices 25 and 26 are connected in parallel with each other. On whichever of the light receiving devices 25 and 26, remote-control light signal falls, an induced photocurrent is input to a light receiving circuit 21. The light receiving circuit 21 in turn judges whether the photocurrent is induced by a remote-control light signal. If the photocurrent is induced by a remote-control light signal, the light receiving circuit 21 outputs a reception signal to the control circuit 22. The control circuit 22 drives the camera operation control units and features 23 according to the reception signal, and executes respective camera operations. Incidentally, the camera is powered by a battery 24.

Figure 4:
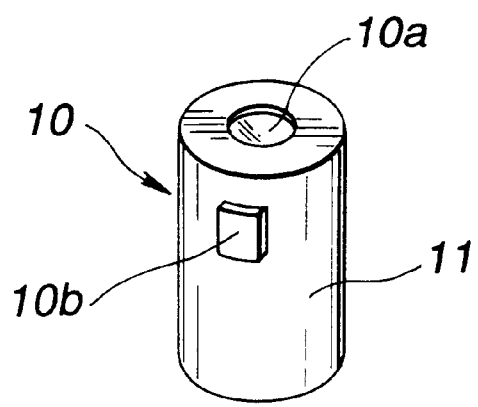
FIG. 4 is an oblique view of a remote-control transmitter employed in remote-control photography to be performed using the camera in accordance with the embodiment of FIG. 1.

FIG. 4 is an oblique view showing the appearance of the remote-control transmitter 10 for projecting signal light used for remote-control photography on the light receiving unit 6 or 7 of the camera of this embodiment. The remote-control transmitter 10 has an operation button 10b and a light transmission window 10a. The operation button 10b is located on a remote-control body 11 for instructing the origination of remote-control light signal. Remote-control light signals are projected through the light transmission window 10a responsively to a manipulation performed on the operation button 10b. An electronic circuit unit including an LED 12 (see FIG. 6) that is an infrared emitting device for projecting remote-control light signals is incorporated inside the light transmission window 10a.

Figure 6:
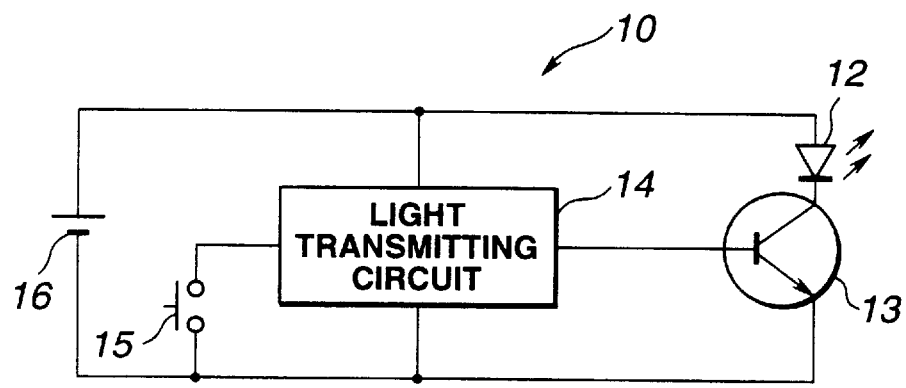
FIG. 6 is a block diagram showing the electronic circuitry of a remote-control transmitter employed in the camera in accordance with the embodiment of FIG. 1.

The electronic circuit unit in the remote-control transmitter 10 is, as shown in the block diagram of FIG. 6, composed of a battery 16, the LED 12, a switching transistor 13, a light transmitting circuit 14, and an operation switch 15. The battery 16 serves as a power supply. The LED 12 serves as an infrared emitting device. The switching transistor 13 supplies a driving current to the LED 12. The light transmitting circuit 14 controls a current flowing into the transistor 13. The operation switch 15 is turned on or off by manipulating the operation button lob. The operation switch 15 controls the operating state of the light transmitting circuit 14. The battery 16 supplies power to the light transmitting circuit 14 and LED 12.

For carrying or preserving the camera of this embodiment having the foregoing components, the barrier 2 is, as shown in FIG. 1, slid in the direction of arrow X1, and a main switch is turned off. With an off-state signal, the photographic lens 3 is sunk into a collapsed position. The camera is thus set to a non-photographic (photography-disabled) state in which the photographic lens 3 is shielded by the barrier 2. Moreover, the strobe light unit 5 is also sunk into a stored position P5A in response to a movement made by the barrier 2, to thus become stowed in the camera body 1.

For using the camera of this embodiment to perform photography, the barrier 2 is, as shown in FIG. 2, slid in the direction of arrow X2. The main switch is turned on with the sliding movement. The photographic lens 3 and viewfinder window 4a are opened concurrently. The photographic lens 3 is thrust to a photography-enabled position with an on-state signal output from the main switch. Furthermore, the strobe light unit 5 is moved from the camera body 1 to a raised position P5B at which the strobe light unit 5 can irradiate strobe light.

Moreover, remote-control photography may be carried out from ahead of the camera. Specifically, the remote-control transmitter 10 is operated with the camera set to the photography-enabled state. Remote-control light signals are projected on the remote-control light receiving unit 6 in the camera. Since, the strobe light unit 5 is extended to the raised position P5B, the light receiving window 6a of the remote-control light receiving unit 6 mounted in the face of the distal part of the frame 5a of the strobe light unit is also raised upward. The remote-control light signals are therefore projected reliably on the remote-control light receiving unit 6 without being intercepted by the lens barrel 3a.

On the other hand, remote-control photography may be carried out from behind the camera. Specifically, remote-control light signals are projected on the remote-control light receiving unit 7 mounted in the back of the camera by operating the remote-control transmitter 10. As described above, the strobe light unit 5 is extended to the raised position P5B at which the strobe light unit 5 can irradiate strobe light. The light receiving window 7a of the remote-control light receiving unit 7 therefore also raised upward. The remote-control light signals are therefore projected reliably on the remote-control light receiving unit 7.

As mentioned above, according to the camera of this embodiment, the remote-control light receiving units 6 and 7 are mounted in the frame 5a of the strobe light unit. This configuration requires only in a small space to arrange the remote-control light receiving units 6 and 7. This contributes the realization of a compact and high-density design.

Moreover, the camera of this embodiment may be used to perform remote-control photography. In this case, when the camera is set to the photography-enabled state, the light receiving windows of the remote-control light receiving units 6 and 7 are placed at come to the highest position on the camera body 1. Herein, the highest position is attained only when the camera body is brought to a use state. This is because the light receiving windows are formed in the face and back of the distal part of the frame 5a of the strobe light unit 5. Consequently, a drawback can be avoided, in which remote-control light signals projected from positions ahead of the camera can be prevented from being intercepted by the lens barrel 3a that has been thrust forward. Furthermore, remote-control light signals projected from behind the camera can be projected reliably on the remote-control light receiving unit 7. Moreover, the LED 26 different from the LED 25 in the remote-control light receiving unit 6 is incorporated in the remote-control light receiving unit 7. Remote-control photography can therefore be achieved from behind the camera.

Moreover, when the camera is placed in the non-photographic (photography-disabled) state, the strobe light unit 5 and the remote-control light receiving units 6 and 7 are stowed in the camera body 1. Whether the camera is placed in a remote-control photography-disabled state can be reliably discerned from a position far from the camera. Furthermore, when the camera is in a state to be carried, the remote-control light receiving units 6 and 7 are stowed in the camera body 1 but are not exposed to the outer surface of the camera body 1. It can therefore be prevented that the light receiving windows 6a and 7a of the light receiving units 6 and 7 become soiled with dirty hands. Consequently, the drawback can be resolved in which the ability to detect a remote-control signal is deteriorated.

Incidentally, in the aforesaid camera of the present embodiment, the remote-control light receiving unit is mounted in the back of the strobe light unit as well as in the face thereof. The present invention is not limited to this structure. The remote-control light receiving unit may be mounted in any side other than the back of the strobe light unit, for example, in the lateral side thereof. Moreover, in the aforesaid camera of the embodiment, the remote-control light receiving units are mounted in the distal part of the frame of the strobe light unit. The present invention is not limited to this structure. The remote-control light receiving units may be mounted in the uppermost part, lowermost part, or inner part.

Furthermore, in the aforesaid camera of this embodiment, the strobe light unit 5 is movable between the stowed position and the irradiation-enabled position. The strobe light unit may be structured as a built-in unit of the camera body so as not to project or sink. Even in this case, the remote-control light receiving unit 6 and/or 7 may be mounted in the frame of the strobe light unit.

What is claimed is:

1. A camera with a remote-control photography function, comprising:
    a strobe light unit having a strobe light mounted in a side thereof; and
    a light receiving unit, mounted in said strobe light unit, for receiving remote-control light signals.

2. A camera according to claim 1, wherein said strobe light unit is movable between a stowed position at which it is stowed in a camera body, and an irradiation-enabled position at which it is raised from said camera body and irradiates strobe light.

3. A camera according to claim 2, wherein said light receiving unit for receiving remote-control light signals is mounted in the same side of said strobe light unit as said strobe light.

4. A camera according to claim 2, wherein said light receiving unit for receiving remote-control light signals is mounted near an edge of said strobe light unit.

5. A camera according to claim 2, wherein said light receiving unit for receiving remote-control light signals is mounted in a side of said strobe light unit opposite to said strobe light.

6. A camera according to claim 2, wherein said light receiving unit for receiving remote-control light signals is mounted in a side of said strobe light unit other than said side in which said strobe light is mounted.

7. A camera with a remote-control photography function in which when said camera is set to a photography-enabled state, a strobe light unit is moved to an irradiation-enabled position, said camera comprising:
    a light receiving unit for receiving remote-control light signals mounted in a surface of said strobe light unit and positioned at a location selected from the group consisting of a distal part, an uppermost part, a lowermost part, and an inner part of a frame of said strobe light unit.

* * * * *